(12) United States Patent
Koonjbearry et al.

(10) Patent No.: US 9,038,159 B2
(45) Date of Patent: May 19, 2015

(54) AUTHENTICATION SYSTEM

(71) Applicant: Verizon Patent and Licensing Inc., Basking Ridge, NJ (US)

(72) Inventors: Karmaveer R. Koonjbearry, Flower Mound, TX (US); Velamur Srinivasan Sudharsan, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 245 days.

(21) Appl. No.: 13/691,949

(22) Filed: Dec. 3, 2012

(65) Prior Publication Data

US 2014/0157394 A1 Jun. 5, 2014

(51) Int. Cl.
*H04L 29/06* (2006.01)
(52) U.S. Cl.
CPC ........ *H04L 63/0823* (2013.01); *H04L 63/1483* (2013.01)

(58) Field of Classification Search
CPC ............ H04L 63/0823; H04L 63/0838; H04L 63/0846
USPC ............................... 726/10, 21; 713/156, 168
See application file for complete search history.

(56) References Cited

U.S. PATENT DOCUMENTS

| | | | |
|---|---|---|---|
| 2009/0077383 A1* | 3/2009 | de Monseignat et al. | 713/175 |
| 2009/0132812 A1* | 5/2009 | Kobozev et al. | 713/156 |

* cited by examiner

*Primary Examiner* — Justin T Darrow

(57) ABSTRACT

A user device is configured to request a secure web page from a web page server. The user device is further configured to receive a certificate from the web page server, the certificate including a serial number. The user device is further configured to receive different certificates from a plurality of certificate authentication servers. The user device is further configured to compare the different certificates to the certificate received from the web page server; determine that the certificate is valid; and send information to the web page server based on determining that the certificate is valid.

20 Claims, 10 Drawing Sheets

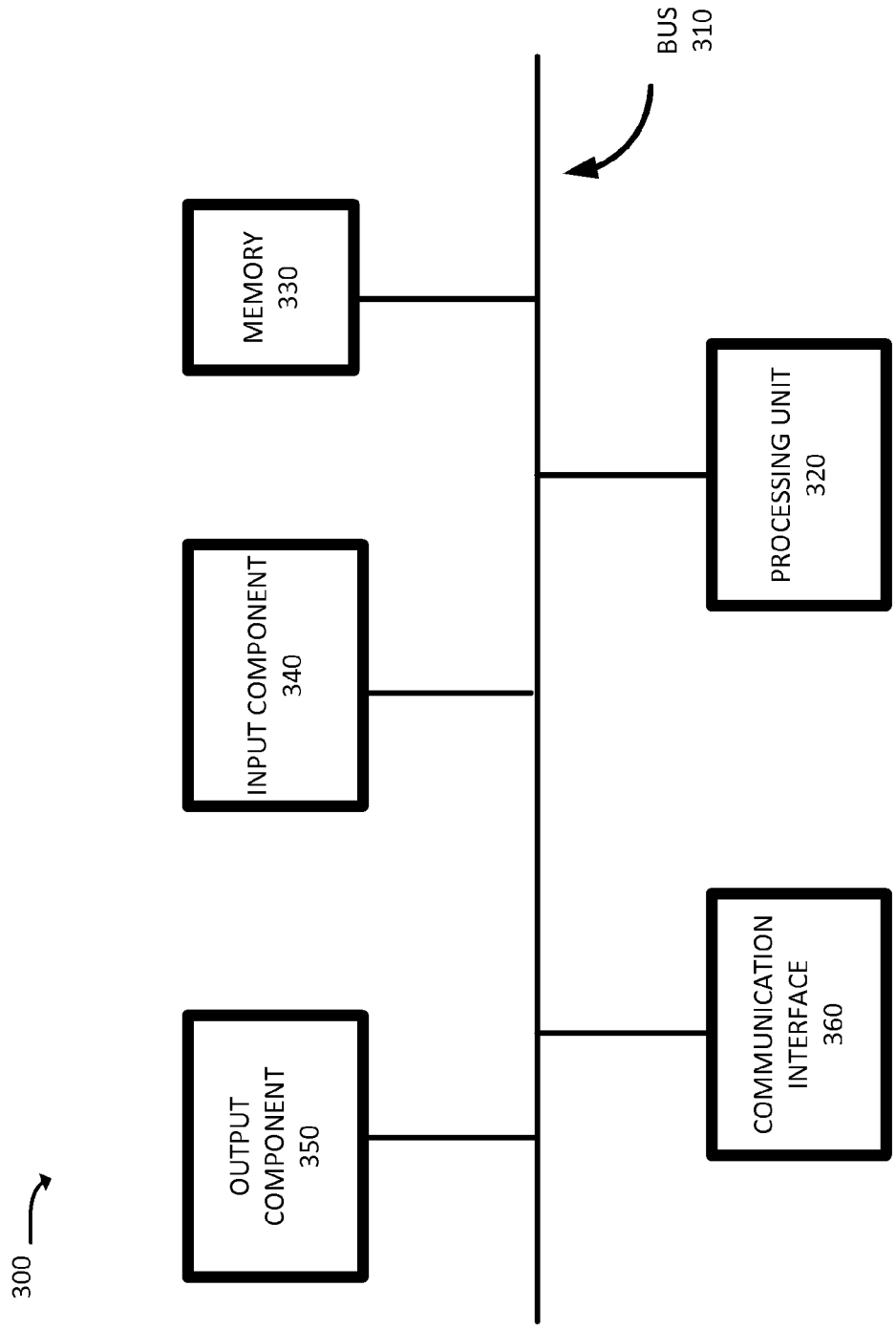

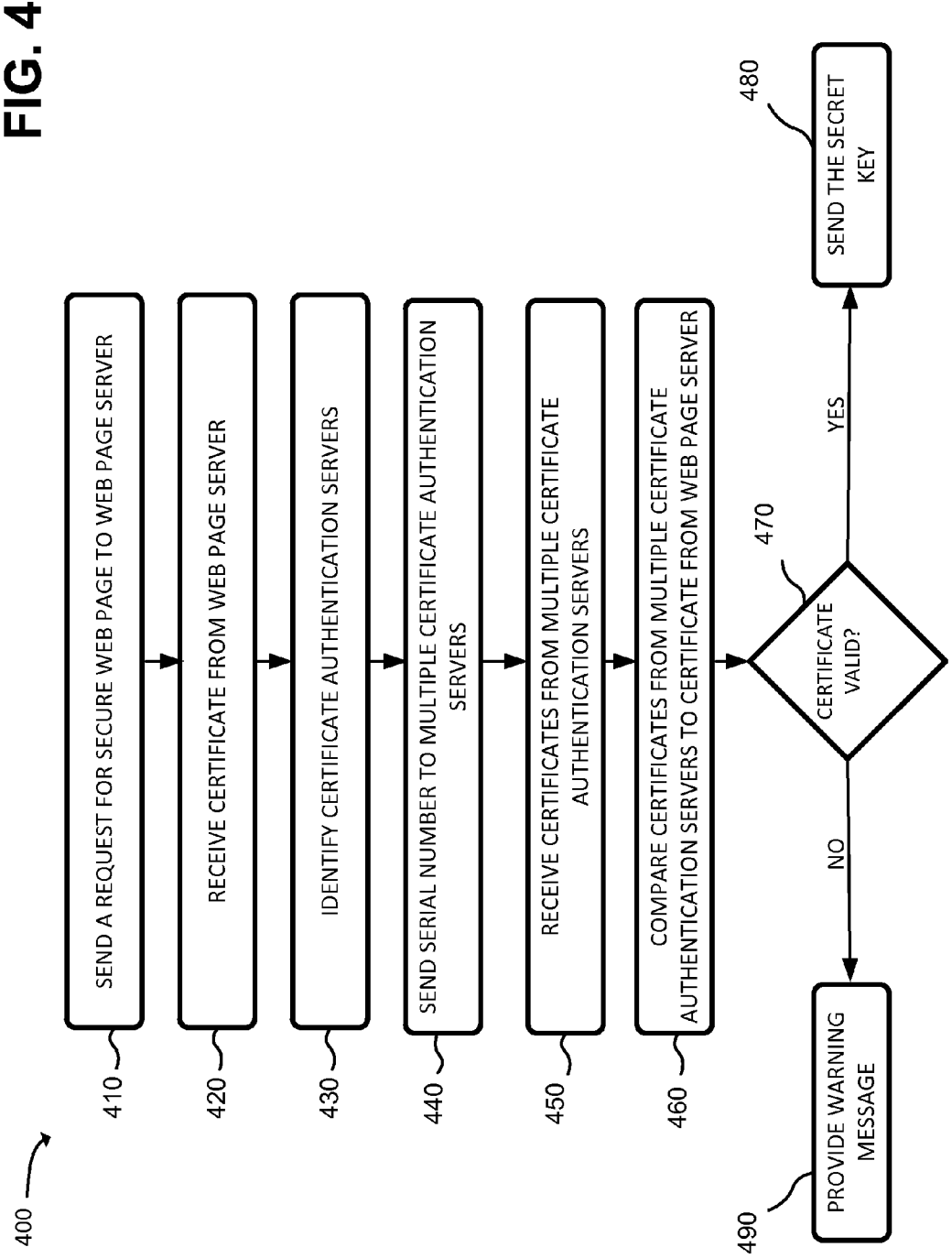

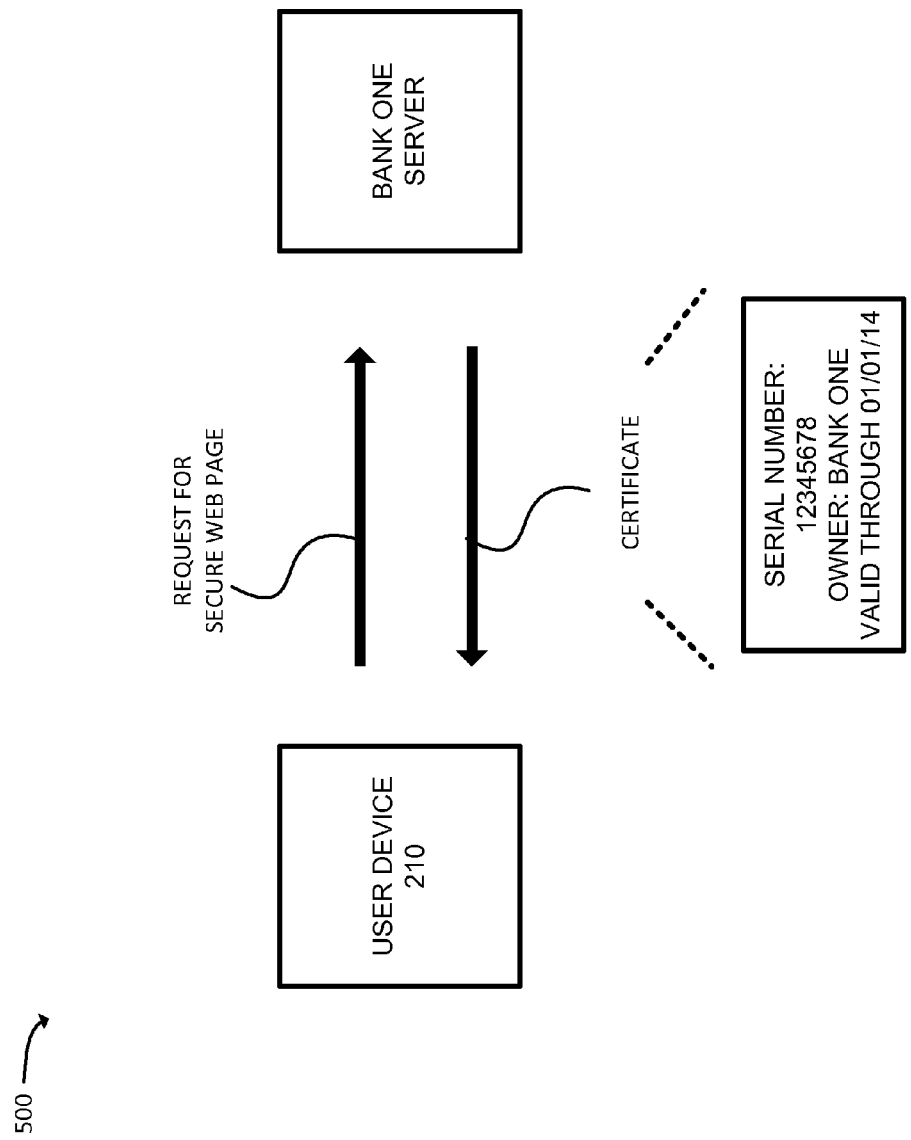

AUTHENTICATION SYSTEM

BACKGROUND

A user may, for example, use a web browser on a user device to display a secure web page. Prior to the secure web page being displayed on the user device, the user device may request and receive a certificate from the web page server associated with the secure web page. The user device may authenticate the certificate to verify that the secure web page is from the web page server and that the web page is not associated with a third party device that is attempting to intercept information being sent to the user device.

BRIEF DESCRIPTION OF DRAWINGS

FIG. 3 is a diagram of example components of one or more devices of FIG. 2;

FIG. 4 is a flow chart of an example process for authenticating a certificate; and FIGS. 5A-5F are diagrams of an example process for authenticating a certificate.

DETAILED DESCRIPTION OF PREFERRED EMBODIMENTS

The following detailed description refers to the accompanying drawings. The same reference numbers in different drawings may identify the same or similar elements.

Systems and/or methods described herein may permit a user device to mitigate the ability of a third party device from intercepting information associated with communications between the user device and a web page server. To prevent the third party device from intercepting the information, the user device may receive multiple certificates from multiple certificate authentication servers to prevent the third party device from determining which one of the multiple certificates is a valid certificate. The valid certificate is used by the user device to verify the identity of the web page server and to commence secure communications with the web page server. By preventing the third party device from determining the valid certificate, the third party device may not be able to use the information associated with the valid certificate to present the third party device as the web page server to the user device. Thus, the third party device may not be able to intercept information sent between the user device and the web page server.

Figure 1:
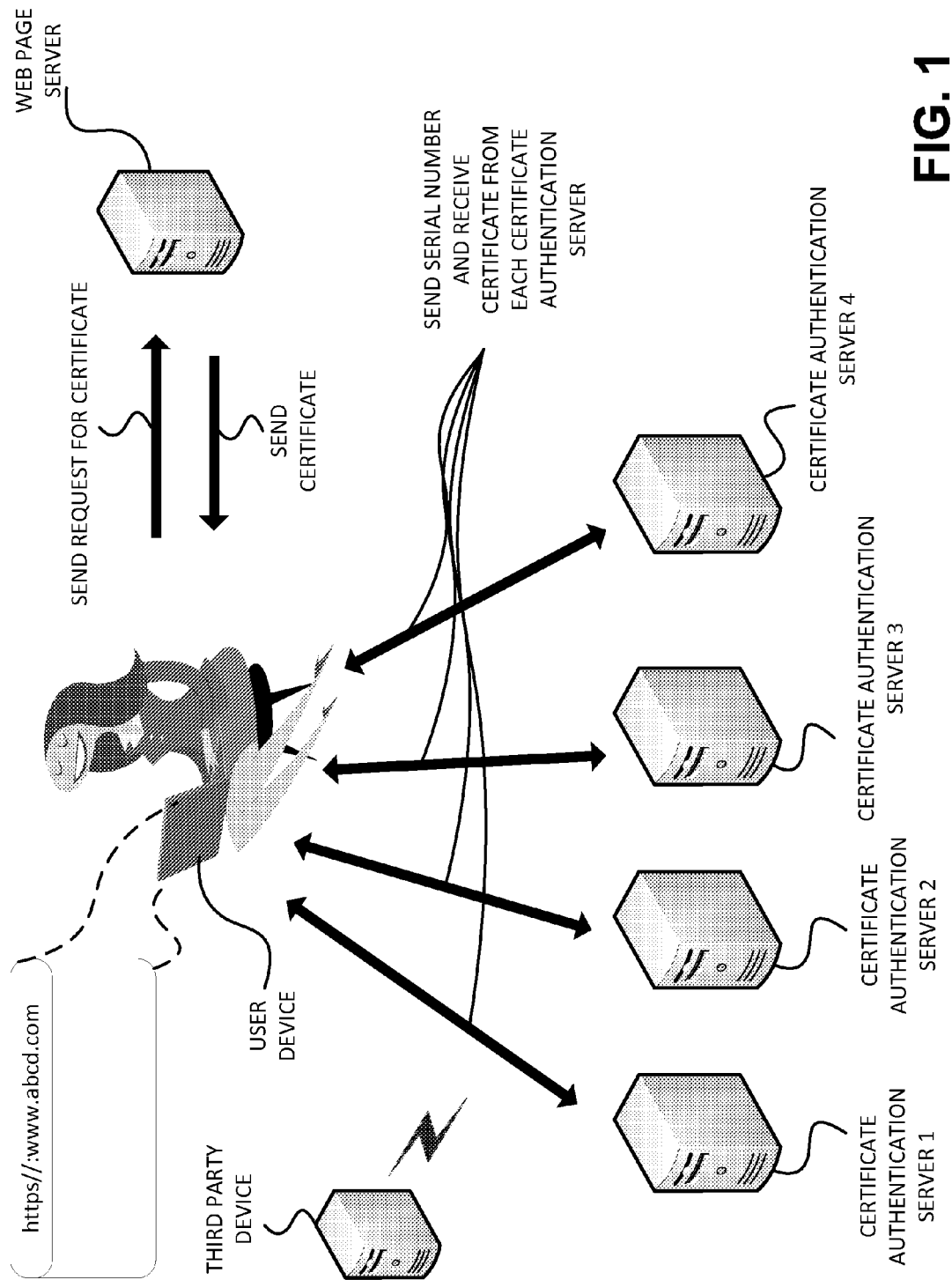
FIG. 1 is a diagram of an overview of an overview of an implementation described herein.

FIG. 1 is a diagram of an overview of an implementation described herein. FIG. 1 shows a user device, a web page server, certificate authentication servers 1, 2, 3, and 4, and a third party device. Assume that a user is using a web page browser on the user device to receive a secure web page from the web page server. For the user to receive the secure web page, assume that the user enters a secure web page address (e.g., https://www.abcd.com) into the web page browser. As shown in FIG. 1, the user device may send a message, based on the secure web page address, to the web page server. The message may include a request for a certificate from the web page server. The web page server may receive the message and may send the certificate to the user device. The certificate may have information including a serial number information identifying, an owner of the certificate (associated with the web page server), information identifying a time period for which the certificate is valid, and/or other information.

The user device may receive the certificate and may determine that the certificate is to be authenticated to verify the identity of the web page server. To authenticate the certificate, the user device may send the serial number, of the certificate, to certificate authentication servers 1, 2, 3 and 4. Certificate authentication server 1 may receive the serial number and compare the serial number to a library of valid serial numbers that have been issued by certificate authentication server 1. If certificate authentication server 1 determines that the serial number matches a valid serial number in the library, then certificate authentication server 1 may send the certificate that is associated with the valid serial number to the user device. Assume that certificate authentication servers 2, 3 and 4 do not find a match between the serial number of the certificate and a valid serial number in the library of valid serial numbers in certificate authentication servers 2, 3 and 4. In this situation, certificate authentication servers 2, 3, and 4 may each create a dummy certificate.

The dummy certificates may include the serial number, received from the user device, along with randomly selected information related to ownership, a valid time period, etc. Certificate authentication servers 2, 3, and 4 may send the dummy certificates to the user device.

The dummy certificates being sent by certificate authentication servers 2-4 may prevent a third party device, as shown in FIG. 1, from discovering the valid certificate being sent by certificate authentication server 1. This may prevent the third party device from attempting to obtain the information regarding the valid certificate and attempting to obtain secure information from the user device by using the valid certificate to present the third party device as the web page server.

The user device may receive a certificate from certificate authentication servers 1, 2, 3 and 4. The user device may compare the certificate information (such as the ownership of the certificate, the valid time period, etc.) in each certificate with the certificate information associated with the certificate received from the web page server to determine whether there is a match. If there is a match, then the user device may determine that the web page server's certificate is valid.

With the validation of the certificate by the user device, the user device may send a confirmation of the certificate authentication to the web page server and commence with communications with the web page server.

As a result, the user device may be able to mitigate the ability of a third party device from obtaining secure information associated with communications between the user device and other devices and/or servers. This may increase the security level of the communications between the user device and the web page server.

Figure 2:
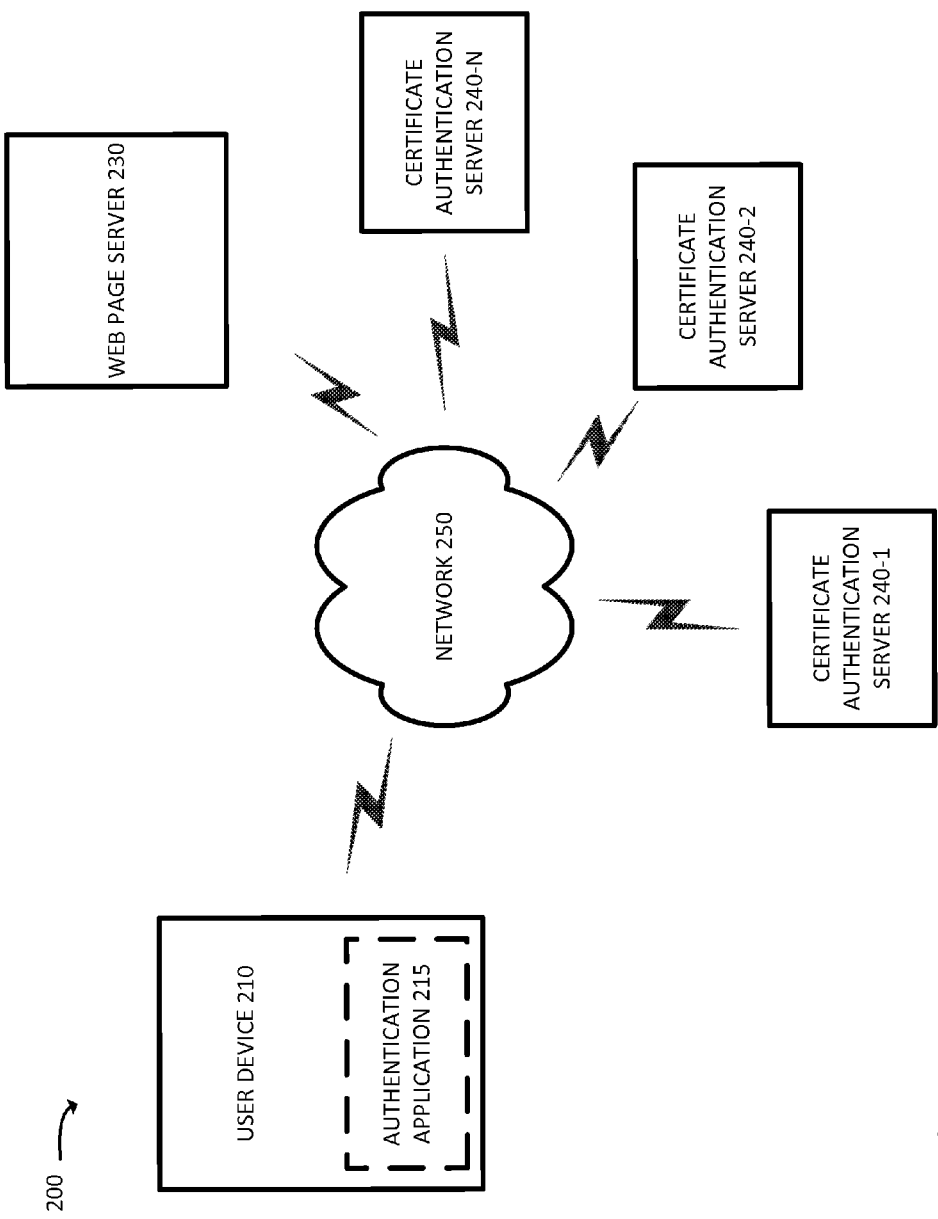
FIG. 2 is a diagram of an example environment in which systems and/or methods described herein may be implemented.

FIG. 2 is a diagram of an example environment 200 in which systems and/or methods described herein may be implemented. Environment 200 may include user device 210, web page server 230, certificate authentication servers 240-1, 240-2, . . . , 240-N (N>1) (referred to generally as "certificate authentication servers 240" or individually as "certificate authentication server 240"), and a network 250.

User device 210 may include one or more devices that are able to communicate via a network, such as network 250. For example, user device 210 may include a personal computer, a laptop, a server, a workstation, a tablet computer, a smart phone, and/or any other type of device capable of communicating with a network. In some implementations, user device 210 may include authentication application 215.

Authentication application 215 may include an application that performs an authentication operation. For example, authentication application 215 may identify certificate authentication servers 240 that may be used to validate certificates and may send requests to certificate authentication servers 240 to obtain certificates that may be used to validate a certificate received from a web page server, such as web page server 230. In some implementations, user device 210 may obtain authentication application 215 from another device. In some other implementations, authentication application 215 may come pre-installed on user device 210 (e.g., as a part of a web browser on user device 210).

Web page server 230 may include one or more network devices that provide web pages and web page content to user device 210. Web page server 230 may provide web pages that include text, video, audio, and/or visual content. Web page server 230 may store certificate information that may be used by user device 210 to verify the identity of web page server 230.

Certificate authentication server 240 may include one or more server devices that store information regarding certificates associated with web page server 230. Certificate authentication server 240 may provide a certificate to web page server 230.

Network 250 may include one or more networks, such as a wide area network (WAN) (e.g., the Internet), a local area network (LAN), a metropolitan area network (MAN), a telephone network (e.g., the Public Switched Telephone Network (PSTN) or a cellular network), a satellite network, or a combination of networks. In some implementations, network 250 may correspond to a private network, a public network, or a combination of a private network and a public network.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 is a diagram of example components of a device 300. Device 300 may correspond to user device 210, web page server 230, and/or certificate authentication server 240. Each of user device 210, web page server 230, and/or certificate authentication server 240 may include one or more devices 300 and/or one more components of device 300.

As shown, device 300 may include a bus 310, a processing unit 320, a memory 330, an input device 340, an output device 350, and a communication interface 360.

Bus 310 may include one or more connections that permit communication among the components of device 300. Processing unit 320 may include one or more processors or microprocessors that interpret and execute instructions. In some implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a button, one or more biometric components, or the like. Output device 350 may include a device that outputs information to the operator, such as a display, a speaker, a light emitting diode, etc.

Communication interface 360 may include any transceiver-like mechanism that enables device 300 to communicate with other devices and/or systems. For example, communication interface 360 may include wired and/or wireless components for communicating with other devices, such as other devices of environment 200.

As described below, device 300 may perform certain operations. Device 300 may perform these operations in response to processing unit 320 executing software instructions contained in a computer-readable medium, such as memory 330. A computer-readable medium may be defined as a non-transitory memory device. A memory device may include space within a single physical storage device or spread across multiple physical storage devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in other implementations, device 300 may include fewer components, different components, differently arranged components, or additional components than depicted in FIG. 3. Alternatively, or additionally, one or more components of device 300 may perform one or more tasks described as being performed by one or more other components of device 300.

FIG. 4 is a flow chart of an example process 400 for authenticating a certificate. In some implementations, process 400 may be performed by user device 210. In some implementations, one or more blocks of process 400 may be performed by one or more other devices, such as certificate authentication server 240, separate from or in combination with user device 210.

Process 400 may include sending a request for a secure web page to a web page server (block 410). For example a user of user device 210 may enter an address (e.g., a hypertext transfer protocol secure (HTTPS) address) for a particular web page into a browser (e.g., Internet Explorer). User device 210 may use the address to send a request for the web page to web page server 230. The request may be sent to web page server 230 in the format of a HELLO message. For example, the HELLO message from user device 210 may include information, such as an identifier for web page server 230 and an identifier for user device 210 (e.g., an Internet Protocol (IP) address).

A request for a secure web page by using "HTTPS," may be sent by user device 210 to web page server 230 via port 443. Receiving the request for a secure web page, via port 443, may indicate to web page server 230 that user device 210 is requesting a secure web page that may be a part of a transport layer security (TLS) protocol used for authenticating web page server 230 and/or a secure socket layer (SSL) protocol used for authenticating web page server 230.

Process 400 may include receiving a certificate from the web page server (block 420). For example, web page server 230 may send a certificate to user device 210 based on receiving the request for the secure web page, described with regard to block 410. The certificate may be part of a TLS and/or SSL protocol that may require a certificate to verify the identification of web page server 230.

The certificate may include information about the ownership of the certificate (e.g., an e-mail address, an owner's name, etc., associated with web page server 230), a duration of validity (e.g., certificate is valid from Oct. 1, 2012 to Nov. 1, 2012), a certificate identifier, such as a serial number, identifier information regarding a certificate authentication provider (e.g., a name, such as Cybertrust) that provided the certificate to web page server 230, and/or other information.

Additionally, web page server 230 may send a public key to user device 210. Authentication application 215, in user device 210, may receive the certificate and the public key. Authentication application 215 may store the public key.

Process 400 may include identifying certificate authentication servers (block 430). For example, authentication application 215, on user device 210, may determine that a particular certificate authentication server 240 provided the certificate associated with web page server 230. Authentication application 215 may determine the particular certificate authentication server 240 is based on an identifier (e.g., a name) of certificate authentication server 240 that is received from web page 230. Authentication application 215 may also have information stored regarding additional certificate authentication servers 240.

Process 400 may include sending a serial number to multiple certificate authentication servers (block 440). For example, user device 210 may send the serial number of the certificate (sent to user device 210 by web page server 230) to multiple certificate authentication servers 240 based on information stored by authentication application 215 (described with regard to block 430). Each certificate authentication server 240 may be associated with a different certificate authority organization (e.g., Cybertrust, VeriSign, etc.). User device 210 may send the serial number to all certificate authentication servers 240 identified by authentication application 215 or a subset of certificate authentication servers 240 identified by authentication application 215.

Process 400 may include receiving certificates from the multiple certificate authentication servers (block 450). For example, user device 210 may receive a certificate from each of the certificate authentication servers 240. Each of the certificate authentication servers 240 may compare the serial number, received from user device 210, to serial numbers stored in a library of valid serial numbers.

If certificate authentication server 240 determines that the serial number matches a serial number stored within the library of valid serial numbers, then certificate authentication server 240 may provide the certificate associated with the serial number to user device 210.

It is assumed that if the serial number matches one of the valid serial numbers in the library, that the information (regarding the ownership of the certificate, the certificate authentication provider, the duration of validity of the certificate, and/or the other information) in the certificate sent by certificate authentication server 240 to user device 210 will match the information (regarding the ownership of the certificate, the certificate authentication provider, the duration of validity of the certificate, and/or the other information) in the certificate sent by web page server 230 to user device 210.

Certificate authentication server 240 may retrieve information (e.g., the ownership of the certificate, the certificate authentication provider, the duration of validity of the certificate, etc.), associated with the valid serial number, in the library of valid serial numbers. Each valid serial number in the library may have certificate information that certificate authentication server 240 may use to create a certificate.

If certificate authentication server 240 determines that the serial number does not mach a serial number within the library of serial numbers, then certificate server 240 may create a dummy certificate. The dummy certificate may be a certificate that is created by a certificate authentication server 240 to prevent a third party device from determining the valid certificate being sent from a certificate authentication server 240 to user device 210. The dummy certificate may have the same serial number as the serial number provided by user device 210 and may have information associated with ownership of the certificate, the certificate authentication provider, the duration of validity of the certificate, and/or other information.

Since the serial number does not match any of the valid serial numbers in the library of valid serial numbers, the certificate information (e.g., ownership of the certificate, the certificate authentication provider, the duration of validity information, etc.) may be created by certificate authentication server 240. In some implementations, certificate authentication server 240 may randomly select the information (outside of the serial number) that will be included in the certificate. In some implementations, certificate authentication server 240 may select particular information to include in the certificate, based on one or more factors, such as the serial number received from user device 210.

Process 400 may include comparing the certificates received from the multiple certificate authentication servers to the certificate received from web page server 230 (block 460). For example, user device 210 may compare the certificates received from multiple certificate authentication servers 240 with the certificate received from web page server 230 to determine whether one or more of the certificates received from certificate authentication servers 240 matches the certificate received from web page server 230. User device 210 may compare information regarding the serial number, ownership of the certificate, the certificate authentication provider, the duration of validity of the certificate, and/or other information in the certificates received from certificate authentication servers 240 to the same information in the certificate received from web page server 230 to determine whether the certificate is valid.

Process 400 may include determining if the certificate, received from the web page server 230, is valid (block 470). For example, if user device 210 determines that the information in one of the certificates received from certificate authentication servers 240 matches the information in the certificate received from web page server 230, user device 210 may determine that the certificate received from web page server 230 is valid. If, on the other hand, user device 210 determines that the information in none of the certificates received from certificate authentication server 240 matches the information in the certificate received from web page server 230, user device 210 may determine that the certificate received from web page server 230 is not valid.

If the certificate is valid (block 470—YES), then process 400 may include sending the secret key (block 480). For example, authentication application 215, on user device 210, may create a secret key. User device 210 may send a message, encrypted with the public key (sent with the certificate, described with regard to block 420), to web page server 230. The message may include information that notifies web page server 230 that the certificate has been validated and that web page server 230 may securely communicate with user device 210. The message may also include the secret key. Web page server 230 may decrypt the message (using the public key) to retrieve the secret key.

User device 210 may use the secret key to encrypt messages sent to web page server 230 and user device 210 may use the secret key to decrypt messages received from web page server 230. Web page server 230 may use the secret key to encrypt messages sent to user device 210 and web page server 230 may use the secret key to decrypt messages received from user device 210.

If the certificate is not valid (block 470—NO), then process 400 may include providing a warning message (block 490). For example, authentication application 215 may determine, based on the type of communication between user device 210 and web page server 230, whether the user, of user device 210, be given the option to continue to attempt to connect to the requested web page.

Authentication application 215 may not provide the user the option to continue the communication if the communication is associated with information such as financial information (e.g., credit card numbers, bank account information, etc.), personal information (date of birth, social security number, etc.), and/or other types of personal information. Instead, authentication application 215 may terminate the connection and provide a message for display on user 210 that the communication is terminated. If the communication is associated with other types of information (e.g., general questions associated with a survey associated with political positions, sports, favorite department stores, etc.), then authentication server 215 may display a message that gives an option to the user, of user device 210, to continue the communication.

While FIG. 4 describes an example of user device 210 using authentication application 215 to authenticate web page server 240, web page server 240 may, for example, use authentication application 215 to authenticate user device 210 in a manner similar to that described in FIG. 4.

While a series of blocks has been described with regard to FIG. 4, the blocks and/or the order of the blocks may be modified in other implementations. Further, non-dependent blocks may be performed in parallel.

Figure 5B:
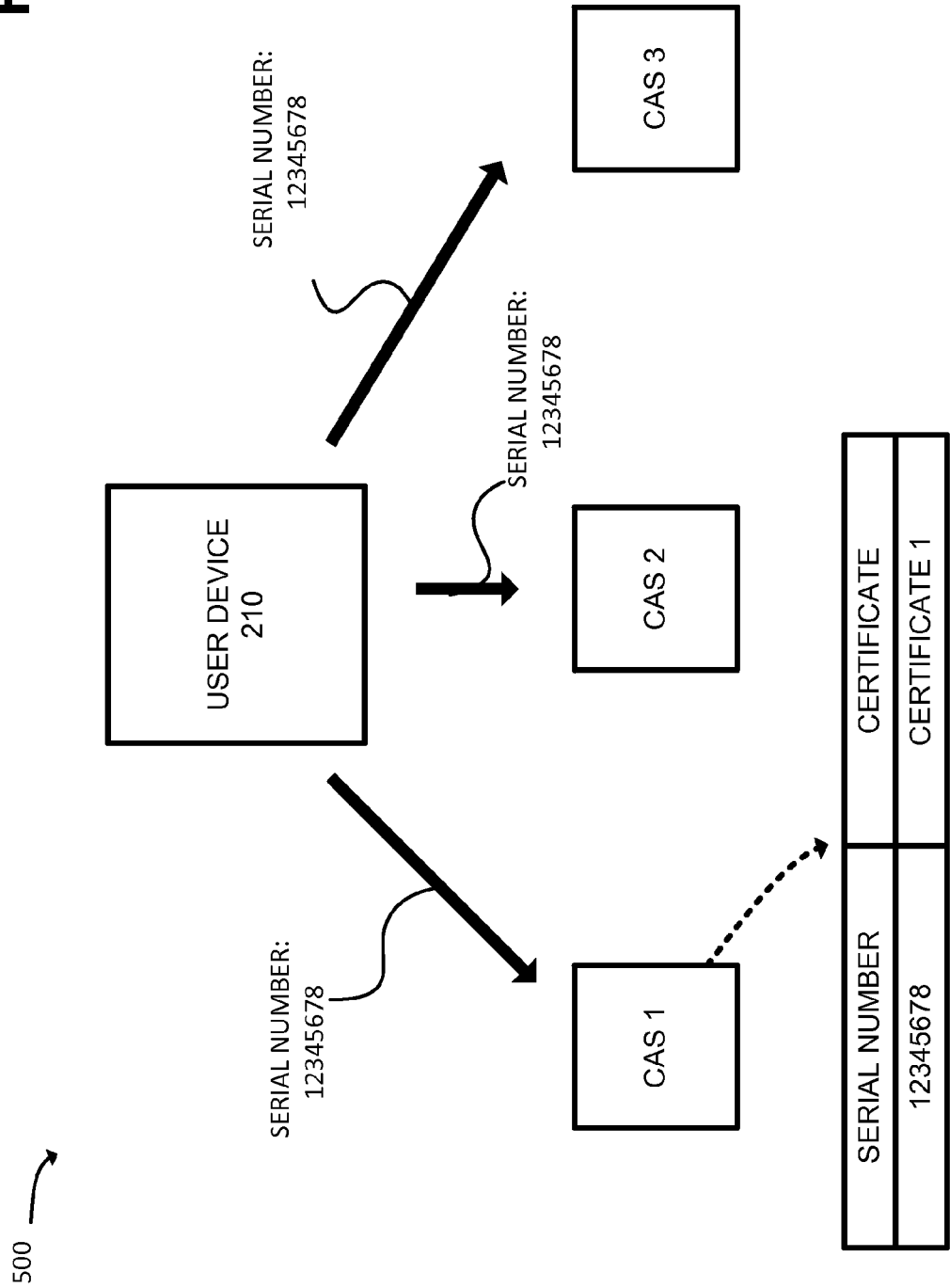

FIGS. 5A-5F are an example 500 of process 400 described above with regard to FIG. 4. For example 500, assume that Bill, a user, is using user device 210 to log into his bank account with Bank One. Assume that Bill types in the address for Bank One (https:///www.bankone.com) into a web page browser displayed on user device 210 and presses an enter key on a keypad associated with user device 210. Upon Bill pressing the enter button, user device 210 sends a request for a secure web page to the Bank One server, as shown in FIG. 5A. The Bank One server may receive the request for the secure web page and based on the request for the secure web page, send a certificate to user device 210. Assume that the certificate includes a serial number ("12345678"), information regarding the owner of the certificate ("Bank One") and a valid time period for the certificate ("valid through Jan. 1, 2014").

User device 210 may receive the certificate and may determine (using authentication application 215 downloaded on user device 210) that the certificate is to be authenticated to verify the identity of the web page server. User device 210 may also receive a public key from the Bank One server. To authenticate the certificate, user device 210 may send, as shown in FIG. 5B, the serial number ("12345678") to three different certificate authentication servers, CAS 1, CAS 2, and CAS 3.

Figure 5C:
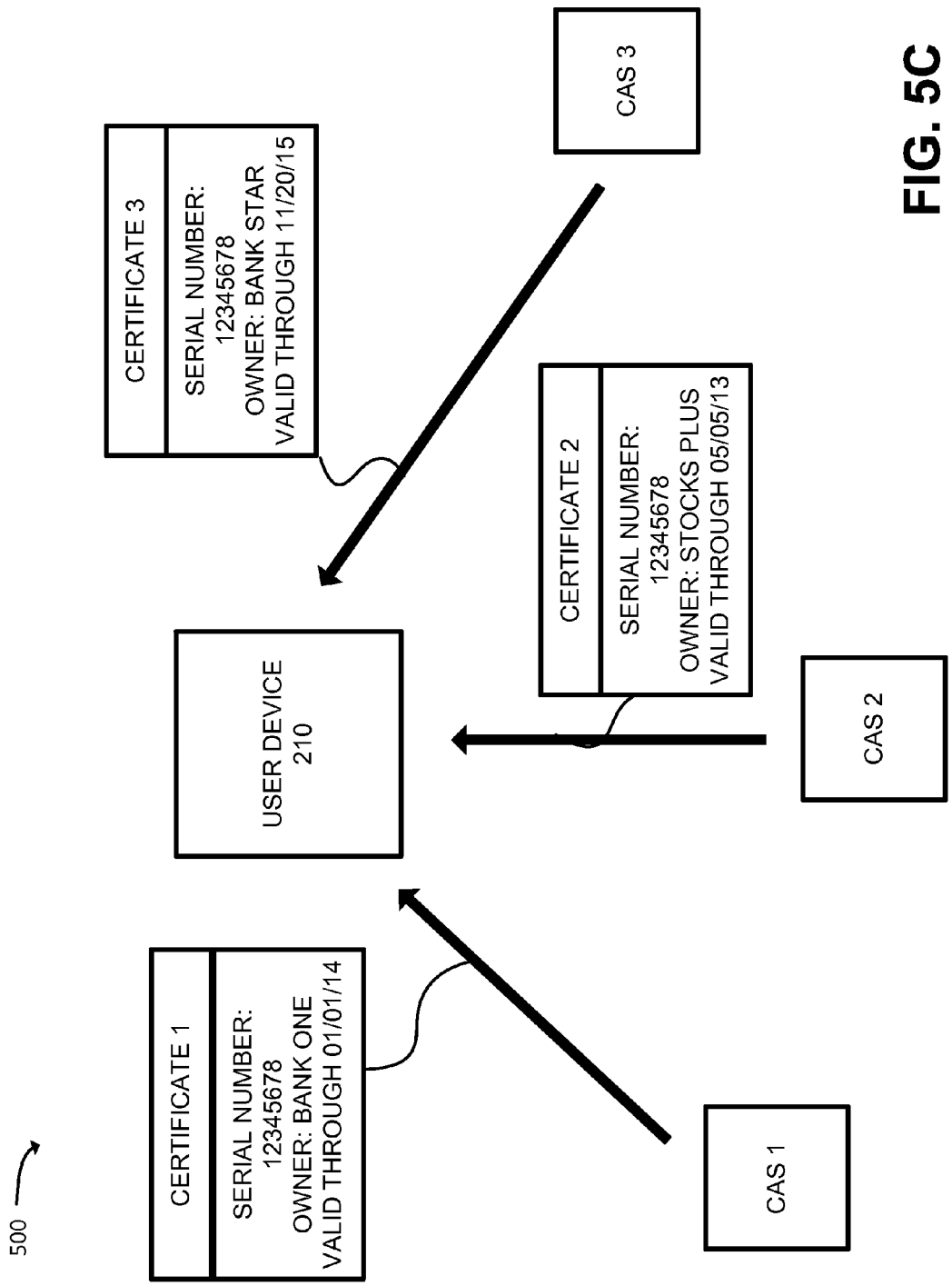

CAS 1 may receive the serial number and compare the serial number to a library of valid serial numbers that have been issued by CAS 1. As shown in FIG. 5B, assume that the library of valid serial numbers includes a serial number that matches the serial number received from user device 210. CAS 1 may retrieve certificate 1 and send certificate 1 to user device 210, as shown in FIG. 5C. The valid serial number in the library is associated with certificate 1. Certificate 1 may include a serial number ("12345678"), ownership ("Bank One"), and a valid time period for the certificate ("valid through Jan. 1, 2014").

CAS 2 may also receive the serial number and compare the serial number to a library of valid serial numbers that have been issued by CAS 2. Assume that CAS 2 does not find a match between the serial number ("12345678") received from user device 210 and a valid serial number in the library. CAS 2 may create a dummy certificate, certificate 2 and send certificate 2 to user device 210, as shown in FIG. 5C. Certificate 2 may include the serial number, received from user device 210, along with randomly selected information related to ownership ("Stocks Plus") and a valid time period ("valid through May 5, 2013").

CAS 3 may receive the serial number and compare the serial number to a library of valid serial numbers that have been issued by CAS 3. Assume that CAS 3 does not find a match between the serial number ("12345678") received from user device 210 and a valid serial number in the library. CAS 3 may create a dummy certificate, certificate 3 and send certificate 3 to user device 210, as shown in FIG. 5C. Certificate 3 may include the serial number, received from user device 210, along with randomly selected information relating to ownership ("Bank Star") and a valid time period ("valid through Nov. 20, 2015").

Figure 5D:
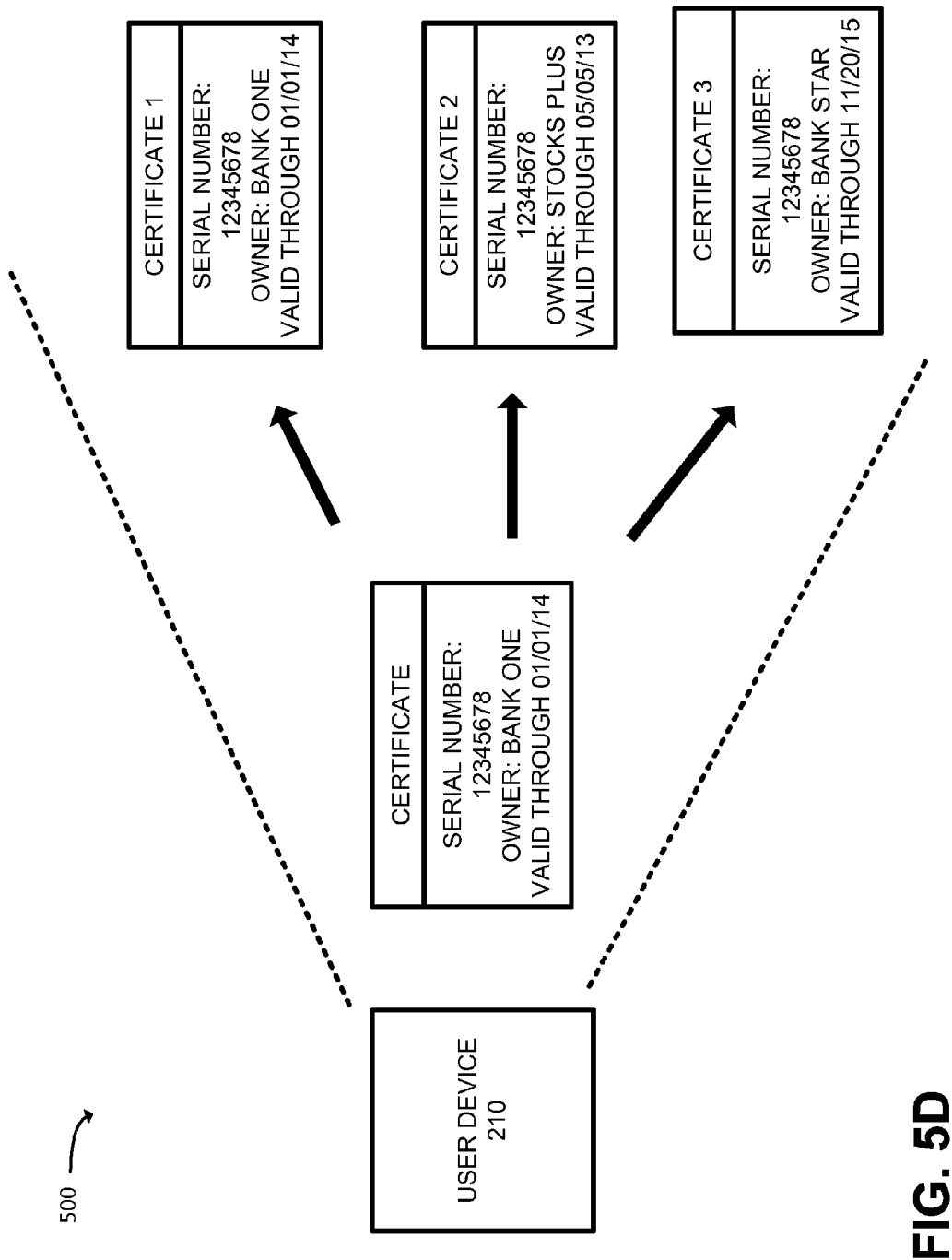

User device 210 may receive the three certificates. As shown in FIG. 5D, user device 210 may compare the certificate (received from Bank One server) with certificates 1, 2 and 3 to determine whether the certificate matches the information in certificates 1, 2, or 3. As shown in FIG. 5D, the information in certificate 1 matches the information in the certificate received from the Bank One server. Since at least one certificate received from the certificate authentication servers matches the certificate, user device 210 determines that the certificate from the Bank One server is valid.

Figure 5E:
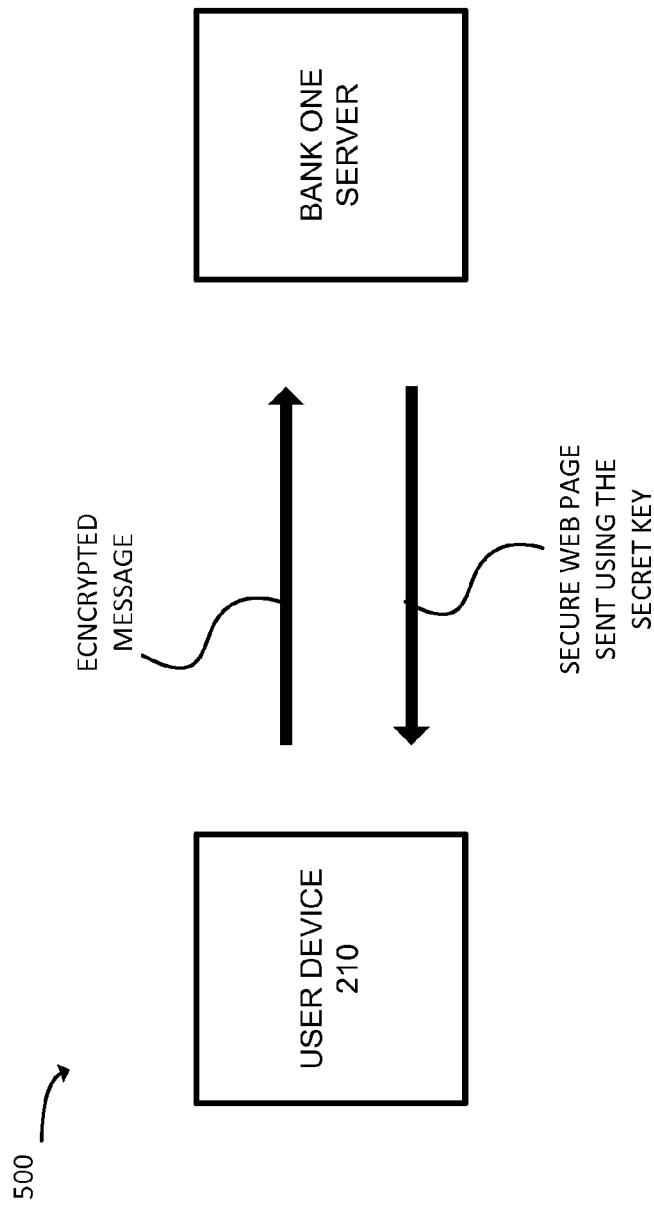

As shown in FIG. 5E, user device 210 may send an encrypted message (encrypted with the public key) to the Bank One server. The encrypted message may include a secret key to be used by Bank One server to send information to user device 210. The Bank One server may receive the encrypted message and decrypts the message with the stored public key. The Bank One server may retrieve the secret key and use the secret key to encrypt the secure web page. The Bank One server may send the secure web page, encrypted with the secret key, to user device 210. User device 210 may receive the secure web page encrypted with the secret key and user device 210 may decrypt the secure web page with the secret key stored by user device 210.

Figure 5F:
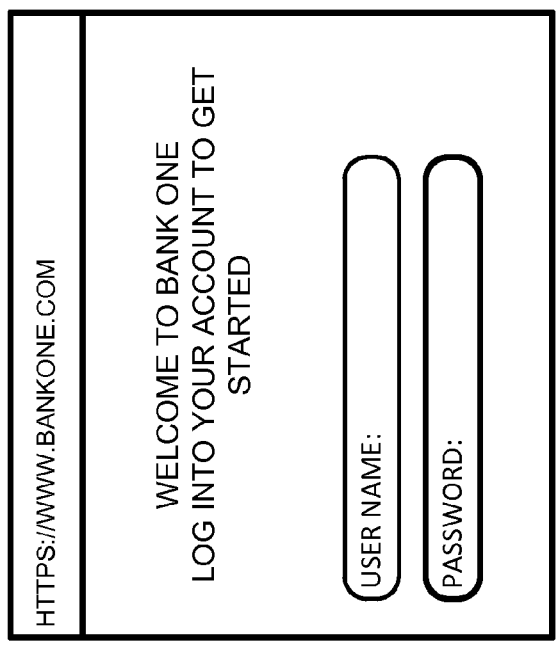

Upon decrypting the secure web page with the secret key, user device 210 may display the secure web page to Bill. Bill may then begin securely communicating with the Bank One server, as shown in FIG. 5F.

Systems and/or methods described herein may permit a user device to mitigate the ability of a third party device from intercepting information associated with communications between the user device and other devices. This may increase the security level of the communications between the user device, the web page server, and the certificate authentication server.

The foregoing disclosure provides illustration and description, but is not intended to be exhaustive or to limit the embodiments to the precise form disclosed. Modifications and variations are possible in light of the above disclosure or may be acquired from practice of the embodiments. For example, the description above focused on user device 210 sending a serial number to certificate authentication servers, in some implementations, user device 210 may send additional or different information from the certificate received from web page server 230.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A device comprising:
   one or more processors to:
   request a secure web page from a web page server;
   receive a certificate from the web page server based on requesting the secure web page,
   the certificate including a serial number;
   send the serial number to a plurality of certificate authentication servers,
   the plurality of certificate authentication servers being different certificate authentication servers;
   receive different certificates from the plurality of certificate authentication servers based on sending the serial number to the plurality of certificate authentication servers;
   compare the different certificates to the certificate received from the web page server;
   determine that the certificate is valid when at least one of the different certificates, from the plurality of certificate authentication servers, matches the certificate received from the web page server; and
   send information to the web page server based on determining that the certificate is valid.

2. The device of claim 1, where the certificate received from the web page server includes ownership information, and
   where the one or more processors, when receiving the different certificates from the plurality of certificate authentication servers, are further to:
   receive at least one of the different certificates that includes the ownership information.

3. The device of claim 1, where the certificate received from the web page server includes valid time period information, and
   where the one or more processors, when receiving the different certificates from the plurality of certificate authentication servers, are further to:
   receive at least one of the different certificates that includes the valid time period information.

4. The device of claim 1, where the certificate received from the web page server further includes at least one of first ownership information, or a first valid time period, and
   where at least one certificate, of the different certificates, corresponds to a dummy certificate,
   the dummy certificate including the serial number and at least one of second ownership information or a second valid time period,
   the second ownership information being different than the first ownership information, and
   the second valid time period being different than the first valid time period.

5. The device of claim 1, where the one or more processors are further to:
   create a secret key based on determining that the certificate is valid;
   send the secret key to the web page server;
   receive a message from the web page server that is encrypted with the secret key; and
   use the secret key to decrypt the message received from the web page server.

6. The device of claim 1, where the one or more processors, when requesting the secure web page from the web page server, are further to:
   request the secure web page using secure socket layer protocol.

7. The device of claim 1, where the one or more processors are further to:
   request a second secure web page from a second web page server,
   the second web page server being different than the web page server;
   receive a second certificate from the second web page server, based on requesting the second secure web page,
   the second certificate being associated with a second serial number;
   send the second serial number to the plurality of certificate authentication servers;
   receive additional certificates from the plurality of certificate authentication servers, based on sending the second serial number to the plurality of certificate authentication servers;
   compare the additional certificates with the second certificate;
   determine that the second certificate is invalid when the additional certificates do not match the second certificate received from the second web page server; and
   display a warning message based on determining that the second certificate is invalid.

8. The device of claim 7, where the warning message includes an option to continue communication with the second web page server.

9. The device of claim 7, where the one or more processors are further to:
   terminate communications with the second web page server based on determining that the second certificate is invalid.

10. A method comprising:
   requesting, by a user device, a secure web page from a web page server;
   receiving, by the user device, a certificate from the web page server based on requesting the secure web page, the certificate including a serial number;
   sending, by the user device, the serial number to a plurality of certificate authentication servers,
      the plurality of certificate authentication servers being different certificate authentication servers;
   receiving, by the user device, different certificates from the plurality of certificate authentication servers based on sending the serial number to each of the plurality of certificate authentication servers;
   determining, by the user device, that the certificate is valid when at least one of the different certificates, from the plurality of certificate authentication servers, matches the certificate received from the web page server; and
   sending, by the user device, a message to the web page server based on the certificate being valid.

11. The method of claim 10, where sending the serial number to the plurality of certificate authentication servers includes:
   sending the serial number to the plurality of certificate authentication servers based on information, stored by the user device, regarding the plurality of certificate authentication servers.

12. The method of claim 10, where receiving the different certificates from the plurality of certificate authentication servers includes:
   receiving one or more dummy certificates from one or more of the plurality of certificate authentication servers,
      the one or more dummy certificates having information that does not match information in the certificate received from the web page server.

13. The method of claim 10, where the certificate, received from the web page server, includes an identifier of at least one certificate authentication server of the plurality of certificate authentication servers.

14. The method of claim 10, further comprising:
   creating a secret key based on determining that the certificate is valid; and
   sending at least one message, to the web page server, that is encrypted with the secret key.

15. A non-transitory computer-readable medium for storing instructions, the instructions comprising:
   a plurality of instructions, that when executed by one or more processors of a user device, cause the one or more processors to:
      request a secure web page from a web page server;
      receive a certificate from the web page server based on requesting the certificate,
         the certificate including first information;
      send the first information to a plurality of certificate authentication servers,
         the plurality of certificate authentication servers being different certificate authentication servers;
      receive different certificates from the plurality of certificate authentication servers based on sending the first information to the plurality of certificate authentication servers;
      compare the different certificates to the certificate received from the web page server;
      determine that the certificate is valid when at least one of the different certificates, from the plurality of certificate authentication servers, matches the certificate received from the web page server; and
      send information to the web page server based on determining that the certificate is valid.

16. The non-transitory computer-readable medium of claim 15, where the one or more instructions, that cause the one or more processors to receive the different certificates from the plurality of certificate authentication servers, further cause the one or more processors to:
   receive at least one dummy certificate,
      the dummy certificate including the first information and additional information,
      the additional information being different than information in the certificate received from the web page server.

17. The non-transitory computer-readable medium of claim 15, where the one or more instructions, that cause the one or more processors to receive the different certificates from the plurality of certificate authentication servers, further cause the one or more processors to:
   receive at least one of the different certificates that includes valid time period information that matches valid time period information of the certificate.

18. The non-transitory computer-readable medium of claim 15, where the one or more instructions, when executed by the one or more processors, further cause the one or more processors to:
   create a secret key based on determining that the certificate is valid; and
   send at least one message, to the web page server, that is encrypted with the secret key.

19. The non-transitory computer-readable medium of claim 15, where the one or more instructions, when executed by the one or more processors, further cause the one or more processors to:
   request a second certificate from a second web page server,
      the second certificate being different than the certificate received from the web page server, and
      the second web page server being different than the web page server;
   receive the second certificate from the second web page server, based on requesting the second certificate, the second certificate including second information;
   send the second information to the plurality of certificate authentication servers;
   receive additional certificates from the plurality of certificate authentication servers;
   compare the additional certificates with the second certificate;
   determine that the second certificate is invalid when the different certificates from the plurality of certificate authenticate servers do not match the certificate received from the web page server; and
   display a warning message based on determining that the second certificate is invalid.

20. The non-transitory computer-readable medium of claim 19, where the one or more instructions, when executed by the one or more processors, further cause the one or more processors to:
   terminate communications with the second web page server based on determining that the second certificate is invalid.

* * * * *